Patented Feb. 29, 1944

2,342,663

UNITED STATES PATENT OFFICE 2,342,663

MANUFACTURE OF PHTHALOCYANINES

Norman Hulton Haddock, Blackley, Manchester, England, assignor to Imperial Chemical Industries Limited, a corporation of Great Britain No Drawing. Application November 3, 1941, Serial No. 417,743. In Great Britain November 2, 1940

3 Claims. (Cl. 260—314)

(Granted under the provisions of sec. 14, act of March 2, 1927; 357 O. G. 5)

This invention relates to the manufacture of dyestuffs and more paraticularly to the manufacture of sulphur-containing dyestuffs.

According to the present invention we make sulphur-containing dyestuffs by reducing a copper phthalocyanine sulphonyl chloride with zinc in the presence of a mineral acid and oxidising the copper mercaptophthalocyanine so-obtained. Conveniently we may reduce the copper phthalocyanine sulphonyl chloride by treating it in suspension in dilute hydrochloric acid with zinc dust. The reduction product, namely, the copper mercaptophthalocyanine, is readily oxidised in contact with the atmosphere or in an aqueous suspension containing dissolved oxygen, probably to a polydisulphide. In this way there are produced dyestuffs which can be applied to cellulosic material from sodium sulphide solution in the same way as sulphur dyestuffs. The new dyestuffs give green dyeings of excellent fastness to washing, chemick and light. These dyeings may be discharged to clear whites by steaming in the presence of dimethyl (sulphobenzyl) phenylammonium chloride, sodium hydroxide and sodium formaldehyde sulphoxylate.

The copper phthalocyanine sulphonyl chlorides which are used as starting materials are obtainable by treating the required copper phthalocyanine sulphonic acid or copper phthalocyanine with chlorosulphonic acid at an elevated temperature in the manner described in British specification No. 515,637 (U. S. P. 2,219,330). We may use for example as starting material copper phthalocyanine tetra-(4)-sulphonyl chloride.

In starting with copper phthalocyanine sulphonyl chlorides obtained as described above our preferred process comprises pouring the sulphonation reaction mixture on to ice and water containing acid, and then adding zinc dust to the suspension of copper phthalocyanine sulphonyl chloride so formed and allowing the temperature to rise to about 50° C. The copper mercaptophthalocyanine which is in suspension is then oxidised by heating the suspension to 90–100° C. in contact with the atmospheric oxygen.

The following examples, in which the parts are by weight, illustrate but do not limit the invention.

Example 1

20 parts of copper tetra-(4)-sulphophthalocyanine and 510 parts of chlorosulphonic acid are heated at 145–150° C. for 3 hours. The reaction mixture is poured on to 1500 parts of ice mixed with 500 parts of concentrated hydrochloric acid. The copper phthalocyanine tetra-(4)-sulphonyl chloride is precipitated in the form of a suspension.

200 parts of zinc dust are gradually added with vigorous stirring to the above suspension whilst the temperature is allowed to rise to 40° C. A green suspension of copper tetra-(4)-mercaptophthalocyanine is formed. The mixture is now heated to 90° C. and stirred in contact with atmospheric oxygen at that temperature for ½ hour, whereby the mercaptophthalocyanine becomes oxidised. The resulting bright green suspension is then filtered off, washed free from acid and dried in air. The product is a green powder which is insoluble in water and dilute aqueous alkalies but dissolves in aqueous sodium sulphide solution. The latter solution which is bluish green dyes cotton in dull blue shades, turning to bright green on exposure to the air. The dyeings so produced are of outstanding fastness to washing, chemick and light.

Instead of copper tetra-(4)-sulphophthalocyanine an equal weight of copper phthalocyanine may be used. In this case, sulphonation and conversion into the sulphonyl chloride are effected concurrently by the chlorosulphonic acid. The product is similar in appearance and reactions to that obtained above.

Example 2

20 parts of copper tetra-(4)-sulphophthalocyanine are dissolved in 510 parts of chlorosulphonic acid and then 20 parts of acetic anhydride are added. The mixture is heated and stirred at 115–120° C. for 2 hours. After cooling the reaction mixture is poured onto 1500 parts of crushed ice, and the bright blue precipitate thus obtained is filtered and washed with ice-cold dilute sodium acetate solution until free from mineral acid.

The above filter-cake is suspended in 800 parts of water and stirred with 100 parts of zinc dust at room temperature for 16 hours. 1100 parts of concentrated hydrochloric acid are now gradually added to the suspension with good agitation, the temperature being allowed to rise to 40° C. The resulting green suspension of copper tetra-(4)-mercaptophthalocyanine is now treated as described in Example 1.

I claim:

1. Process for the manufacture of sulphur-containing dyestuffs comprising reducing a copper phthalocyanine sulphonyl chloride with zinc in the presence of a mineral acid and oxidising the copper mercaptophthalocyanine so-obtained to the disulphide stage.

2. Process for the manufacture of sulphur-containing dyestuffs as claimed in claim 1, in which the sulphonyl chloride is copper phthalocyanine tetra-(4)-sulphonyl chloride.

3. Process for the manufacture of a sulphur-containing dyestuff which comprises adding zinc to an aqueous suspension of copper-phthalocyanine-tetra-sulphonyl chloride containing hydrochloric acid at a temperature of about 40° C. to form copper-tetra-mercapto-phthalocyanine in suspension, and heating the resulting suspension in contact with atmospheric oxygen at a temperature of about 90° C. to convert the tetra-mercapto compound into a coloring matter which is insoluble in water and dilute aqueous alkalies but dissolves in aqueous sodium sulphide solution and dyes cotton from said solution in blue shades turning to green on exposure to air.

NORMAN HULTON HADDOCK.